United States Patent

Ikeda

(10) Patent No.: US 6,340,040 B1
(45) Date of Patent: Jan. 22, 2002

(54) VEHICLE TIRE INCLUDING MAIN GROOVES AND LUG GROOVES

(75) Inventor: Akio Ikeda, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/429,077

(22) Filed: Oct. 29, 1999

(30) Foreign Application Priority Data

Oct. 30, 1998 (JP) .......................... 10-310747
Oct. 30, 1998 (JP) .......................... 10-310748

(51) Int. Cl.$^7$ .................. B60C 11/03; B60C 11/12; B60C 11/13; B60C 103/04
(52) U.S. Cl. .................. 152/209.18; 152/209.22; 152/209.27; 152/903; 152/DIG. 3
(58) Field of Search .................. 152/209.15, 209.18, 152/209.22, 209.25, 209.27, 209.28, 902, 903, DIG. 3

(56) References Cited

U.S. PATENT DOCUMENTS

| | | | | |
|---|---|---|---|---|
| 3,584,670 A | * | 6/1971 | Verdier ........................ | 152/902 |
| 4,057,089 A | * | 11/1977 | Johannsen | |
| 4,667,717 A | * | 5/1987 | Graas ........................ | 152/209.28 |
| 5,234,042 A | * | 8/1993 | Kuhr et al. | |
| 5,421,389 A | * | 6/1995 | Favre et al. ........... | 152/209.28 |
| 5,885,384 A | * | 3/1999 | Hmuro | |
| 5,964,266 A | * | 10/1999 | Boiocchi et al. ............ | 152/903 |
| 5,996,661 A | * | 12/1999 | Gerresheim et al. ... | 152/209.28 |
| 6,095,216 A | * | 8/2000 | Cenni et al. ........... | 152/209.28 |
| 6,109,317 A | * | 8/2000 | Iwamura et al. ....... | 152/209.28 |
| 6,138,728 A | * | 10/2000 | Miyazaki ............... | 152/209.15 |
| 6,164,354 A | * | 12/2000 | Yamakage ............. | 152/209.28 |

FOREIGN PATENT DOCUMENTS

| | | | | |
|---|---|---|---|---|
| EP | 688685 | * | 12/1995 | |
| EP | 715972 | * | 6/1996 | |
| JP | 4-126612 | * | 4/1992 | ............ 152/209.28 |
| JP | 6-40215 | * | 2/1994 | ................. 152/903 |

* cited by examiner

Primary Examiner—Steven D. Maki
(74) Attorney, Agent, or Firm—Birch, Stewart, Kolasch & Birch, LLP

(57) ABSTRACT

A vehicle tire comprises circumferentially extending straight main grooves including a central main groove on the tire equator and an axially outer main groove on each side thereof, first lug grooves extending from the axially outer main grooves towards the central main groove but not reached thereto, each of the first lug grooves comprising a first curved portion, a second curved portion and a straight portion arranged in this order from the outer main groove towards the central main groove, wherein a width of the first curved portion is in the range of from 60 to 80% of the width of the outer main groove, a width of the second curved portion is not less than 25% but less than 60% of the width of the outer main groove, and a width of the straight portion is not more than 25% of the width of the outer main groove, an inclination angle of each first lug groove with respect to the tire circumferential direction being in the range of from 30 to 50 degrees at the outer main groove, and gradually decreasing therefrom in the first and second curved portions, and being substantially zero in the straight portion, a depth of each first lug groove being smaller in the straight portion than the first curved portion. Corners formed between the circumferential grooves and lateral grooves are rounded by a conical face of which radius of curvature gradually increases towards the radially outside of the tire.

11 Claims, 5 Drawing Sheets

Fig.2
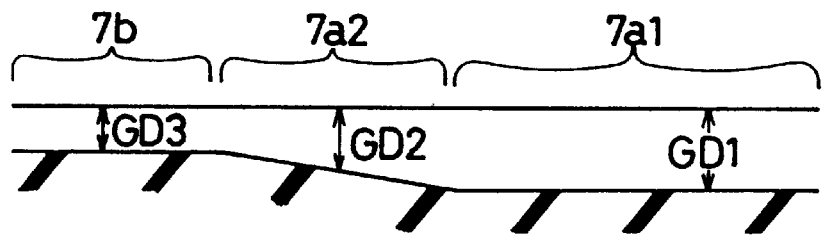
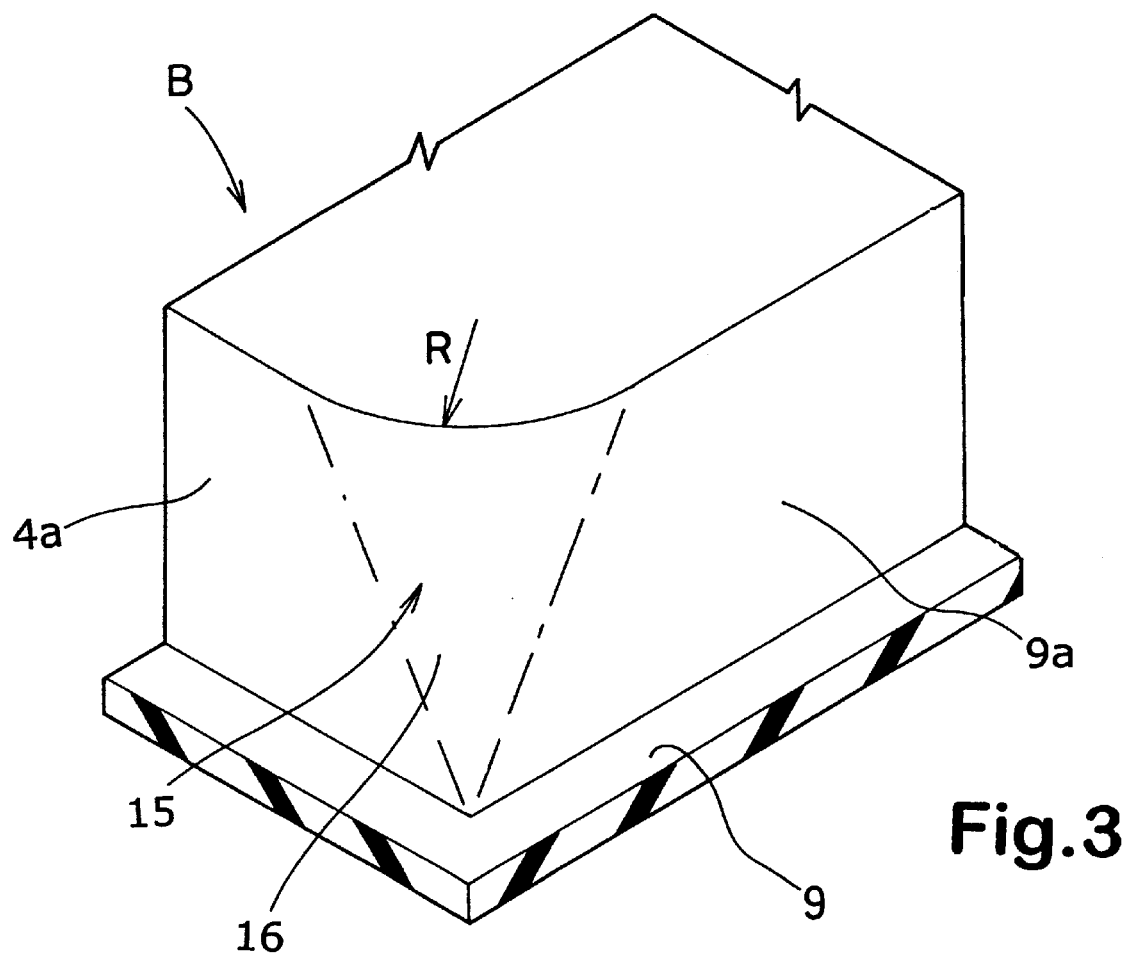
Fig.3

VEHICLE TIRE INCLUDING MAIN GROOVES AND LUG GROOVES

The present invention relates to a vehicle tire having an improved tread portion capable of improving wet performance without sacrificing wear resistance.

Vehicle tires such as pneumatic tires for passenger cars, light trucks and the like are usually provided with circumferentially extending main grooves and lateral grooves to provide a good wet performance.

If the grooved area is increased, drainage from the ground contacting patch is increased and wet performance may be improved. But, wear resistance, uneven wear resistance tend to decrease.

It is therefore, an object of the present invention to provide a vehicle tire in which wet performance can be improved without sacrificing wear resistance.

According to the present invention, a vehicle tire has a tread portion comprising circumferentially extending straight main grooves including a central main groove on the tire equator and an axially outer main groove on each side thereof, lug grooves extending from the axially outer main grooves towards the central main groove, but terminating before the central main groove, each of the lug grooves comprising a first curved portion, a second curved portion and a straight portion arranged in this order from the outer main groove towards the central main groove, wherein a width of the first curved portion is in the range of from 60 to 80% of the width of the outer main groove, a width of the second curved portion is not less than 25% but less than 60% of the width of the outer main groove, and a width of the straight portion is not more than 25% of the width of the outer main groove, an inclination angle of each lug groove with respect to the tire circumferential direction being in the range of from 30 to 50 degrees at the outer main groove, and gradually decreasing therefrom in the first and second curved portions, and being substantially zero in the straight portion.

a depth of each lug groove being smaller in the straight portion than the first curved portion.

Embodiments of the present invention will now be described in detail in conjunction with the accompanying drawings.

FIG. 2 shows a distribution of the depth of a lug groove along the groove center line.

FIG. 3 is a perspective view showing a rounded corner between a circumferential groove and lateral groove.

Figure 1:
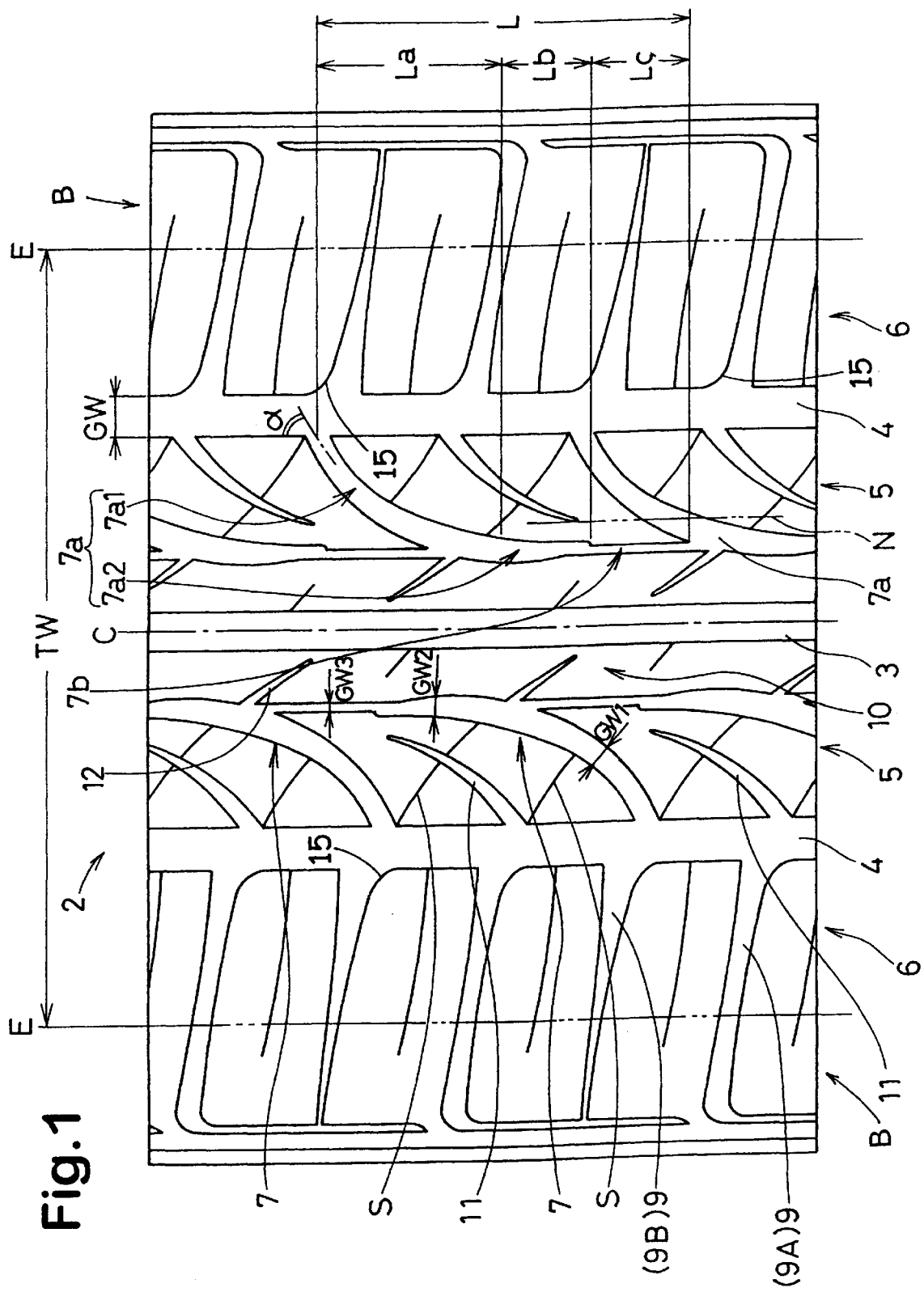
FIG. 1 is a developed plan view of a tire according to the present invention showing an example of the tread pattern.

FIG. 1 showing a tread portion of a pneumatic tire for passenger cars according to the present invention.

Usually, a pneumatic tire comprises a tread portion with a tread face, a pair of axially spaced bead portions with a bead core therein, a pair of sidewall portions, a carcass extending between the bead portions, and a tread reinforcing belt disposed radially outside the carcass. However, the present invention may be applied to nonpneumatic tires.

In FIG. 1, the tread portion 2 is provided with three main grooves extending straight and continuously in the tire circumferential direction.

The three main grooves include a central main groove 3 extending on the tire equator C, and tow outer main grooves 4 disposed one on each side of the tire equator C, thereby defining an axially inner region 5 between the central main groove 3 and each of the outer main grooves 4, and an axially outer region 6 between each of the outer main grooves 4 and the adjacent tread edge E.

Each of the main grooves 3 and 4 has a width GW in the range of not less than 2.5%, preferably not less than 3%, more preferably not less than 4% of the tread width TW. The main grooves 3 and 4 are the substantially same width in the example shown in FIG. 1, but they may be differed.

Here, the tread width TW is the axial distance between the edges E of the tread face or the ground contacting region under a standard condition in which the tire is mounted on a standard rim and inflated to a standard load and then loaded with a standard load. The standard rim is the 'standard rim specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, 180 kPa is used as the standard pressure, and 88% of the maximum load is used as the standard load.

The tread width TW is set at at least 80% but preferably at most 95% of the tire width W.

In determining the tire width W, in order to eliminate confusing decorative or protective protrusions provided on the tire sidewall, a nominal tire width appearing in a tire size designation adopted in the above-mentioned tire standard can be used as the tire width W. In case of "195/60R14 85H" in metric system, for example, 195 mm is used as the width W.

Conventional tread width is about 75% or less of the tire width W. Thus, the tread width TW is greatly increased.

Further, the present invention is based on a negative ratio which is not more than 35%, wherein the negative ratio is a ratio Sg/S of the total grooved area Sg in the tread face to the total area S of the tread face. Thus, the negative ratio Sg/S of the tire is set in the range of not more than 35%, preferably set in the range of from 25 to 35%, more preferably 30 to 35%.

As shown in the following Table 1, by increasing the tread width TW in relation to the tire width W and decreasing the negative ratio the wear resistance is greatly improved. Thus, the negative ratio and the tread width are limited in the above-mentioned ranges.

TABLE 1

| TW/W ratio (%) | 75 | 75 | 80 | 80 |
|---|---|---|---|---|
| Negative ratio (%) | 40 | 35 | 40 | 35 |
| Wear resistance (index) | 100 | 110 | 110 | 120 |

Each of the axially outer main grooves 4 is disposed in the middle of the tire equator C and tread edge E, whereby the tread is divided into four roughly equiwidth regions, namely, the above-mentioned axially inner regions 5 and axially outer regions 6. In FIG. 1, the axially outer main grooves 4 are slightly set off towards the axially outside. Thus, the axially inner region 5 is slightly wider than the axially outer region 6.

Each of the axially inner regions 5 is provided with lug grooves 7 each extending axially inwardly from the outer main groove 4 and terminating before the central main groove 3.

Each of the lug grooves 7 comprises a curved portion 7a extending axially inwardly from the outer main groove 4 and a straight portion 7b extending circumferentially from the axially inner end of the curved portion 7a.

As to the inclination angle of the lug groove 7 with respect to the circumferential direction, the inclination angle a at the junction between the curved portion 7a and the outer main groove 4 is in the range of from 30 to 50 degrees, preferably 40 to 50 degrees, more preferably 42 to 48 degrees (in this embodiment 45 degrees), and the inclination angle gradually decreases to substantially 0 degrees from its axially outer end at the junction to the axially inner end at the connection point with the straight portion 7b.

The curved portion 7a includes a first curved portion 7a1 and a second curved portion 7a2.

The first curved portion 7a1 extends axially inwardly from the outer main groove 4, and this portion has a width GW1 of from 60 to 80% of the width GW of the outer main groove 4.

The second curved portion 7a2 extends from the axially inner end of the first portion 7a1 to the straight portion 7b, and this portion has a width GW2 of not less than 25% but less than 60% of the width GW.

The straight portion 7b has a width GW3 of not more than 25% of the width GW.

In the example shown in FIG. 1, the width GW1 gradually increases from the outer main groove 4 towards the axially inside. However, the width GW2 gradually decreases towards the straight portion 7b. The width GW3 is constant. It is also possible that the width GW3 gradually decreases towards the axially inner end of the lug groove.

FIG. 2 shows a distribution of the depth of the lug groove 7 along the groove center line. The depth GD1 is constant and the substantially same as the depth of the axially outer main groove 4. The depth GD3 of the straight portion 7b is less than the depth GD1 of the first curved portion 7a1. The depth GD2 of the second curved portion 7a2 gradually decreases from the first portion 7a1 to the straight portion 7b not to form a stepped difference in the groove bottom. The depth GD3 is not more than 70%, preferably 60 to 70% of the depth GW of the main groove 4. In this example, the depth GD3 is constant. But it may be varied.

As the depth GD2 gradually decreases towards the straight portion 7b, a support for the axially outwardly adjacent tread rubber gradually increases, and uneven wear thereof can be improved.

The end of the straight portion 7b is connected to the curved portion 7a of the circumferentially adjacent lug groove 7. And the straight portion 7b is disposed such that its groove center line is located axially inside the axial center line N of the axially inner region 5. Therefore, the drainage from the tread center region can be further improved.

Preferably, the circumferential length La of the first curved portion 7a1 is 0.5 to 0.6 times the circumferential length L of the lug groove, and the circumferential length Lb of the second curved portion 7a2 is 0.1 to 0.2 times the length L. and the circumferential length Lc of the straight portion 7b is 0.2 to 0.3 times the length L.

In this embodiment, each of the axially inner region 5 is further provided with second narrow lug grooves 11, auxiliary grooves 12 and sipes S.

Each of the second narrow lug grooves 11 is inclined in the same direction as the curved portion 7a and extends from one of the outer main grooves 4 towards the axially inside of the tire and terminates before the first lug groove 7.

The sipes S are inclined in the reverse direction to the curved portion 7a at an angle of from 40 to 50 degrees with respect to the circumferential direction of the tire. The sipe S is a narrow slit or a cut having a width of less than 1 mm, which is narrower than the grooves.

As shown in FIG. 1, between the circumferentially adjacent first lug grooves 7, one narrow lug groove 11 and two sipes S are disposed.

Each of the auxiliary groove 12 extends axially inwards from one of the first lug grooves 7 but terminates before the central main groove 3 so as to form a circumferentially continuously extending narrow rib 10 on each side of the central main groove 3. The auxiliary grooves 12 are inclined in the reverse direction to the first lug grooves 7 at angle of from 40 to 60 degrees with respect to the circumferential direction of the tire. The axially outer end of each auxiliary groove 12 is opened to the first lug groove 7 in the curved portion 7a and near the junction of the circumferentially adjacent first lug grooves 7. By providing those grooves 11 and 12 and sipes S, a directivity of rigidity can be eliminated from the axially inner regions 5 and the wear resistance especially uneven resistance can be improved. As the straight portion 7b of the first lug groove 7 has the minimum width GW3 and minimum depth GD3, the apparent rigidity of the rib 10 is increased, and uneven wear resistance can be increased.

The above-mentioned axially outer regions 6 are provided with lateral grooves 9 called shoulder groove.

The shoulder grooves 9 extend from the axially outermost main grooves 4 to the tread edges E.

In the example shown in FIG. 1, the shoulder grooves 9 include first shoulder grooves 9A and second shoulder grooves 9B arranged alternately in the circumferential direction, wherein the first shoulder grooves 9A have a substantially constant width, but the second shoulder grooves 9B have a variable width which gradually decreases towards the tread edge E. The axially outer regions 6 are further provided between the shoulder grooves 9 with sipes extending almost parallel with the shoulder grooves 9.

Due to the gradually decreasing width of the shoulder grooves 9B, the rigidity of shoulder blocks B increases towards the tread edges E, and tread shoulder wear can be improved.

The tread pattern shown in FIG. 1 is a bidirectional pattern. However, the tread pattern may be modified into a unidirectional pattern by making it symmetrical about the tire equator C. In such a case, the rotational direction is such that the lug grooves 7 contact with the ground in the straight portion 7b prior to the curved portion 7a. In either case, symmetrical or asymmetrical pattern, it is possible to circumferentially shift a half tread pattern on one side of the tire equator from the other half to avoid periodicity of tread pattern to reduce noise generated from the tire during running.

In order to improve tire noise and drainage, corners between circumferential grooves and lateral grooves, for example, corners 15 of the shoulder blocks B are rounded.

As shown in FIG. 3, the corner 15 is provided with a conical face 16 of which radius R of curvature gradually increases towards the radially outside of the tire, wherein the radius R is measured in a plane parallel with the tread face.

Figure 5:
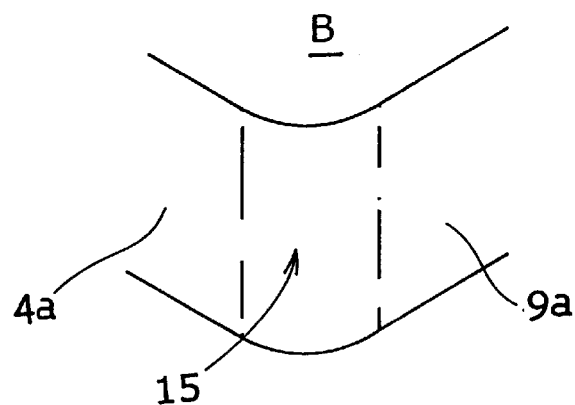
FIG. 5 is a perspective view of a rounded corner used as a reference in a comparison test.

In general, a water flow from a circumferential groove to a lateral groove can be improved by rounding a corner formed between those grooves. If the corner is rounded by a cylindrical face as shown in FIG. 5, an air flow is also increased, and as a result, various noises called "pattern noise", "pumping noise" and the like increase. However, by using a conical face, it is possible to suppress the air flow while improving water flow.

Figure 4:
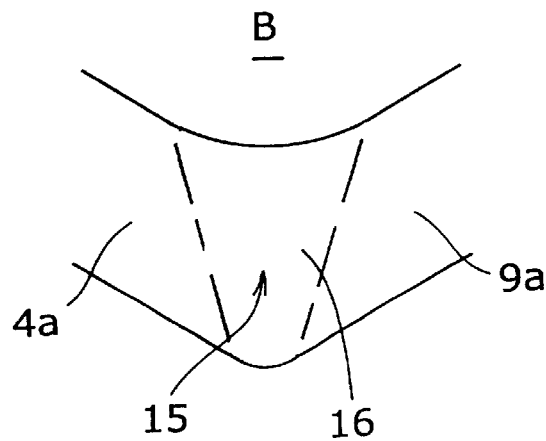
FIG. 4 is a perspective view showing another example of the rounded corner.

The conical face 16 extends from the base of the block B or the bottom of the circumferential groove (main groove) to the top of the block. At the block top, the radius R of curvature is set in the range of from 5 to 10 mm, preferably 6 to 9 mm, more preferably 6 to 8 mm. At the groove bottom, the radius R of curvature is preferably set at substantially zero as shown in FIG. 3. It is however possible that the radius R at the groove bottom has a positive value as shown in FIG. 4. In this case, it is preferable to limit the value in the range of less than 1.5 mm, more preferably less than 1.0 mm in order to reduce noise.

In case of a bidirectional tread pattern as shown in FIG. 1, obtuse-angle corners are preferably provided as the rounded corner 15. But it is also possible to provide other corners as the rounded corner 15.

Figure 7:
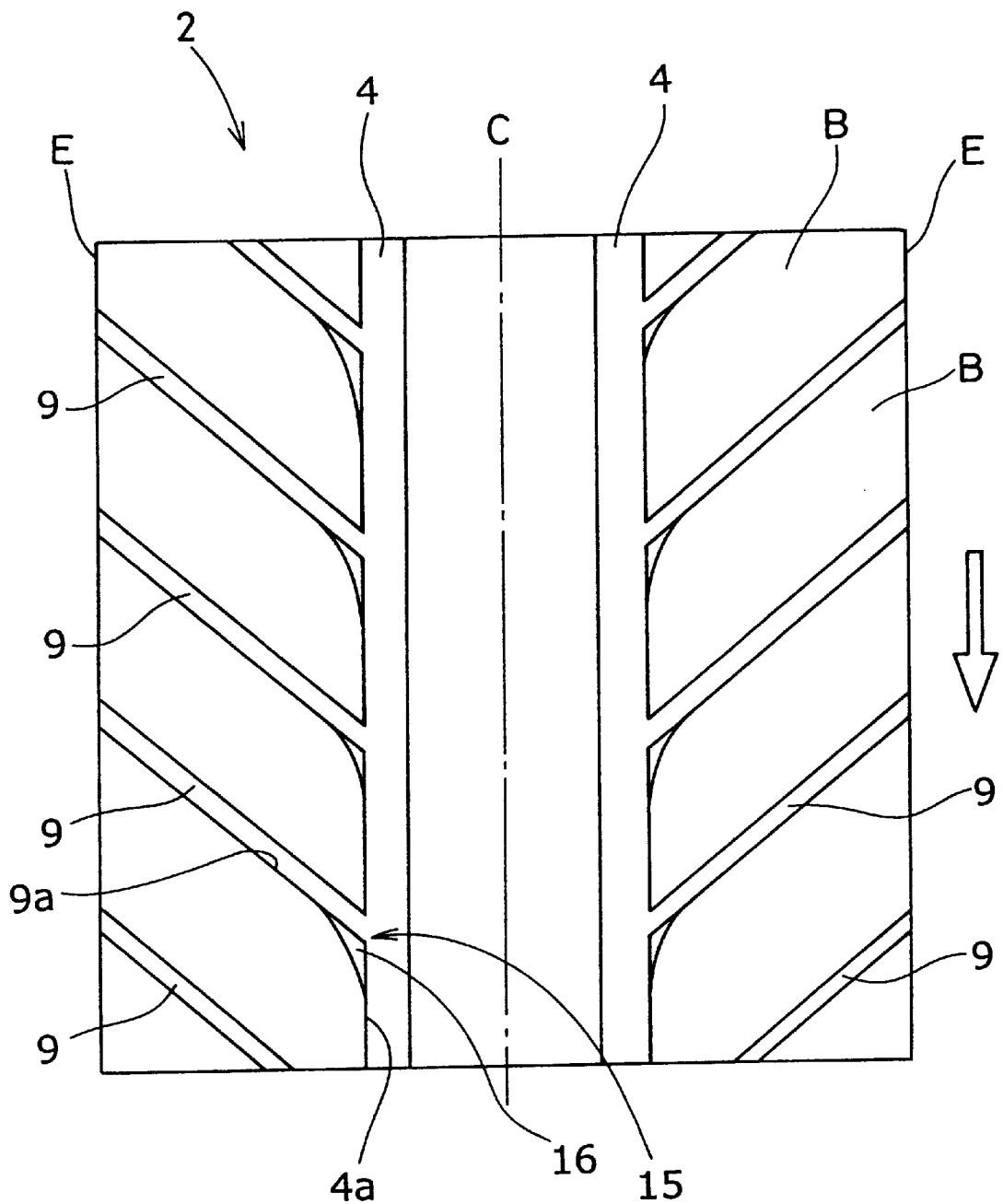
FIG. 7 shows a simplified model for a unidirectional tread pattern.

In case of a unidirectional tread pattern such as FIG. 1 as modified as explained above and FIG. 7 presented as a simple model, it is preferable that toe-side corners are rounded but heel-side corners are angled.

Comparison Tests

Radial tires for passenger cars having the tread pattern shown in FIG. 1 and specifications shown in Table 2 were prepared and tested for wet performance and wear resistance.

Wet performance test: A test car provided on all four wheels with test tires was run on a wet asphalt road in a 100-meter-radius course provided with a five-millimeter-depth twenty-meter-long water pool. The running speed was increased stepwise, and the lateral acceleration (Lateral-G) was measured at the front wheels to obtain the average lateral-G in a speed range of from 50 to 80 km/h. The test results are indicated by an index based on Reference tire 1 being 100. The larger the index, the higher the resistance to aquaplane.

Wear resistance test: The test car was run for 8000 km (50% of expressway, 35% of highway, 15% of mountain road) and thereafter the depth of the central main groove remained was measured. The measured depths are indicate by an index based on Reference tire 1 being 100. The larger the index, the better the wear resistance.

Tire size: 205/65R15 94H

Rim size: 6JJ

Inner pressure: 200 kPa

Test car: Japanese 3000cc passenger car

The test results are shown in Table 2.

TABLE 2

| Tire | Ref. 1 | Ref. 2 | Ref. 3 | Ex. 1 | Ex. 2 |
|---|---|---|---|---|---|
| TW/W ratio | 80% | 80% | 80% | 80% | 80% |
| Negative ratio | 35% | 35% | 35% | 35% | 35% |
| Main groove | | | | | |
| Width (mm) | 8.4 | 8.4 | 8.4 | 8.4 | 8.4 |
| Depth (mm) | 8.3 | 8.3 | 8.3 | 8.3 | 8.3 |
| Lug groove | | | | | |
| Inclination angle α (deg.) | 45 | 45 | 60 | 45 | 30 |

TABLE 2-continued

| Tire | Ref. 1 | Ref. 2 | Ref. 3 | Ex. 1 | Ex. 2 |
|---|---|---|---|---|---|
| First curved portion | | | | | |
| Width (mm) | 5 | 5 | 5 | 5 | 5 |
| Depth (mm) | 5.6 | 8.3 | 8.3 | 8.3 | 8.3 |
| Second curved portion | | | | | |
| Width (mm) | 4.2 | 4.2 | 4.2 | 4.2 | 4.2 |
| Depth (mm) | 5.6 | 8.3 | 8.3–5.6 | 8.3–5.6 | 8.3–5.6 |
| Straight portion | | | | | |
| Width (mm) | 2 | 2 | 2 | 2 | 2 |
| Depth (mm) | 5.6 | 8.3 | 5.6 | 5.6 | 5.6 |
| Axially inner region | | | | | |
| Second lug groove | none | none | none | none | present |
| auxiliary groove | none | none | none | none | present |
| Sipe | none | none | none | none | present |
| Wet performance | 100 | 110 | 100 | 110 | 115 |
| Wear resistance | 100 | 100 | 110 | 110 | 105 |

Form the test results, it was confirmed that the tires according to the present invention can be improved in both the wet performance and wear resistance.

Further, in order to confirm the effect of the conical-rounded corner 15, a noise test and the above-explained wet performance test were conducted.

Figure 8:
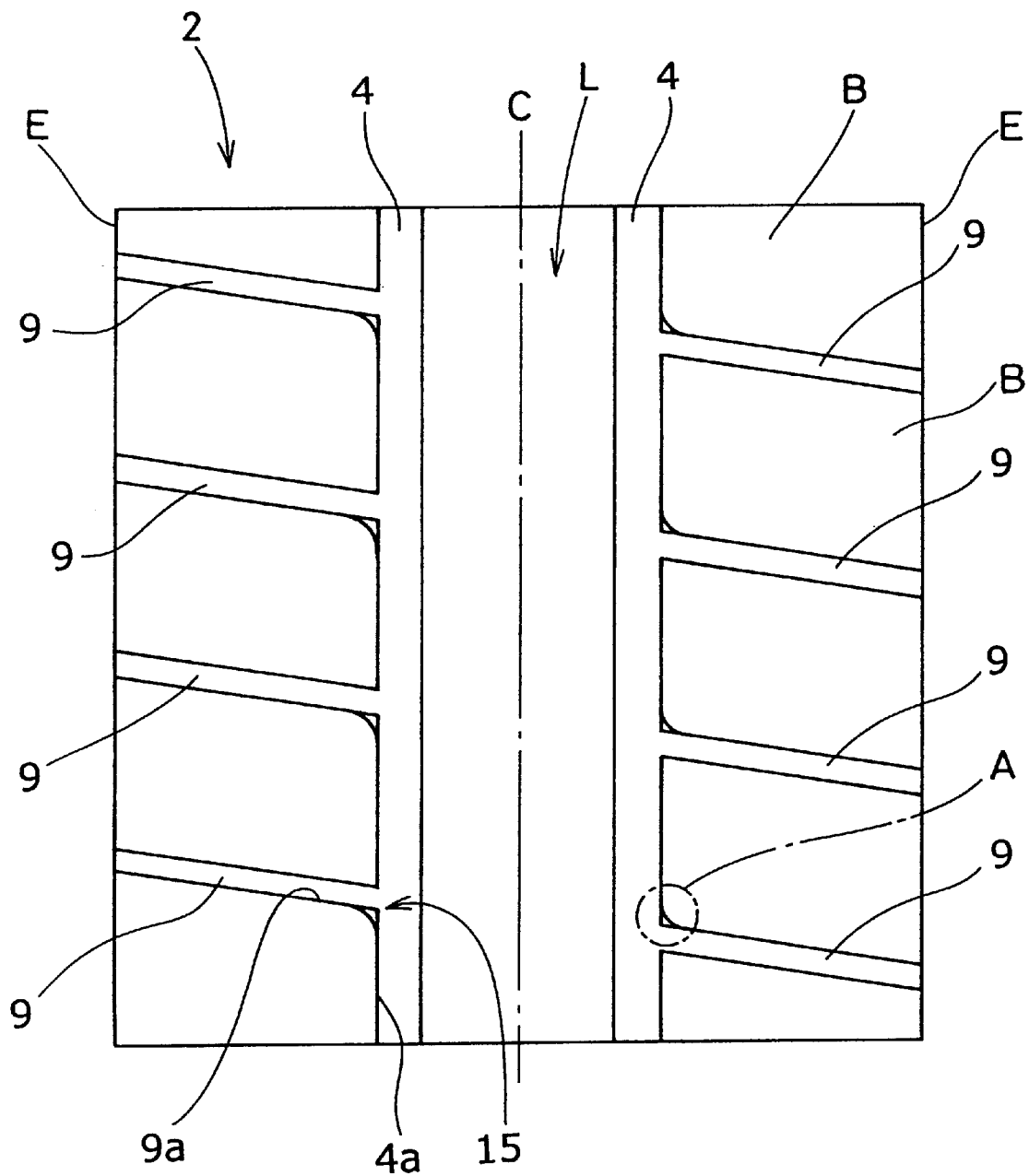
FIG. 8 shows a simplified model for a bidirectional tread pattern used in a comparison test.

Test tires used were pneumatic tires having the same tread pattern except for corners, wherein the tread pattern was simplified as shown in FIG. 8 to focus on the target noise, or air flow noise.

In the noise test, the test car was run in a test circuit course and noise was evaluated into ten ranks by the test driver's feeling. The larger the value, the better the noise performance.

The test results are indicated in Table 3A and Table 3B.

TABLE 3A

Figure 6:
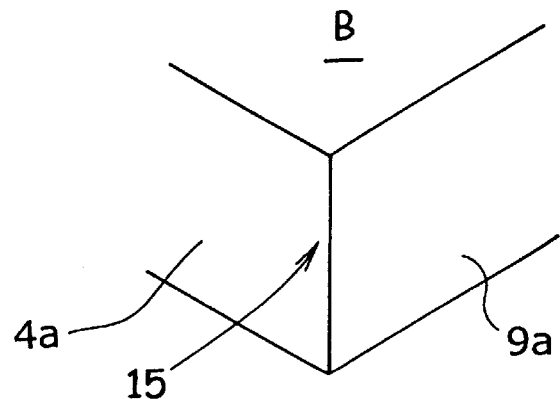
FIG. 6 is a perspective view of an angled corner used in the comparison test.

| Tire | Conv. | Ref. A | Ex. A |
|---|---|---|---|
| Corner | FIG. 6 | FIG. 5 | FIG. 3 |
| Radius R (mm) | | | |
| @ top | 0 | 7 | 7 |
| @ bottom | 0 | 7 | 0 |
| Groove depth (mm) | 7 | 7 | 7 |
| Wet performance | 100 | 110 | 110 |
| Noise performance | 6 | 5.5 | 6 |

TABLE 3B

| Tire | Ex. A | Ex. B | Ex. C | Ex. D | Ex. E |
|---|---|---|---|---|---|
| Corner | FIG. 3 | FIG. 3 | FIG. 3 | FIG. 3 | |
| Radius R (mm) | | | | | |
| @ top | 7 | 3 | 5 | 9 | 7 |
| @ bottom | 0 | 0 | 0 | 0 | 1 |
| Groove depth (mm) | 7 | 7 | 7 | 7 | |
| Wet performance | 100 | 95 | 97 | 105 | 100 |
| Noise performance | 6 | 6 | 6 | 5.5 | 5.5+ |

Form the test results, it was confirmed that by providing conical-rounded corners 15, the wet performance can be improved without deteriorating the noise performance.

What is claimed is:

1. A vehicle tire comprising a tread portion,
   the tread portion provided with circumferentially extending straight main grooves including a central main groove on the tire equator and an axially outer main groove on each side thereof, and first lug grooves extending from the axially outer main grooves towards the central main groove and terminating prior to said central main groove, each of the first lug grooves comprising a first curved portion, a second curved portion and a straight portion arranged in this order from the outer main groove towards the central main groove, wherein a width of the first curved portion is in the range of from 60 to 80% of the width of the outer main groove, a width of the second curved portion is not less than 25% but less than 60% of the width of the outer main groove, and a width of the straight portion is not more than 25% of the width of the outer main groove, an inclination angle of each said first lug groove with respect to the tire circumferential direction being in the range of from 30 to 50 degrees at the outer main groove, and gradually decreasing therefrom in the first and second curved portions, and being substantially zero in the straight portion, a depth of each said first lug groove being smaller in the straight portion than the first curved portion, the circumferential length of the first curved portion is 0.5 to 0.6 times the circumferential length of the first lug groove, and the circumferential length of the second curved portion is 0.1 to 0.2 times the circumferential length of the first lug groove, and the circumferential length of the straight portion is 0.2 to 0.3 times the circumferential length of the first lug groove.

2. The vehicle tire according to claim 1, wherein the straight portion of each of the first lug grooves is connected to the curved portion of the circumferentially adjacent first lug groove.

3. The vehicle tire according to claim 2, wherein the depth of the first curved portion is the substantially same as the depth of the outer main groove, and the depth of the straight portion is not more that 70% of the depth of the outer main groove, and the depth of the second curved portion gradually decreases from the first curved portion to the straight portion.

4. The vehicle tire according to claim 2, wherein second lug grooves and sipes are provided between the circumferentially adjacent first lug grooves, the second lug grooves inclined in the same direction as the curved portions and not connected to any first lug grooves, and the sipes inclined reversely to the curved portions at an angle of from 40 to 50 degrees with respect to the circumferential direction of the tire.

5. The vehicle tire according to claim 2, wherein the tread portion is provided with lateral grooves extending from the main grooves to form corners between the lateral grooves and the main grooves, and at least some of said corners are rounded by a conical face of which radius of curvature gradually increases towards the radially outside of the tire.

6. The vehicle tire according to claim 1, wherein the depth of the first curved portion is the substantially same as the depth of the outer main groove, and the depth of the straight portion is not more than 70% of the depth of the outer main groove, and the depth of the second curved portion gradually decreases from the first curved portion to the straight portion.

7. The vehicle tire according to claim 6, wherein second lug grooves and sipes are provided between the circumferentially adjacent first lug grooves, the second lug grooves inclined in the same direction as the curved portions and not connected to any first lug grooves, and the sipes inclined reversely to the curved portions at an angle of from 40 to 50 degrees with respect to the circumferential direction of the tire.

8. The vehicle tire according to claim 6, wherein the tread portion is provided with lateral grooves extending from the main grooves to form corners between the lateral grooves and the main grooves, and at least some of said corners are rounded by a conical face of which radius of curvature gradually increases towards the radially outside of the tire.

9. The vehicle tire according to claim 1, wherein second lug grooves and sipes are provided between the circumferentially adjacent first lug grooves, the second lug grooves inclined in the same direction as the curved portions and not connected to any first lug groove, and the sipes inclined reversely to the curved portions at an angle of from 40 to 50 degrees with respect to the circumferential direction of the tire.

10. The vehicle tire according to claim 9, wherein the tread portion is provided with lateral grooves extending from the main grooves to form corners between the lateral grooves and the main grooves, and at least some of said corners are rounded by a conical face of which radius of curvature gradually increases towards the radially outside of the tire.

11. The vehicle tire according to claim 1, wherein the tread portion is provided with lateral grooves extending from the main grooves to form corners between the lateral grooves and the main grooves, and at least some of said corners are rounded by a conical face of which radius of curvature gradually increases towards the radially outside of the tire.

* * * * *